United States Patent
King et al.

(10) Patent No.: US 10,402,888 B2
(45) Date of Patent: Sep. 3, 2019

(54) SYSTEM AND METHOD FOR VIRTUAL REALITY CONTENT RATING USING BIOMETRIC DATA

(71) Applicant: Samsung Electronics Co., Ltd, Suwon-si (KR)

(72) Inventors: Peter King, Mountain View, CA (US); Xiang Sun, Mountain View, CA (US); Aaron Lee, Mountain View, CA (US); Christopher Peri, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 36 days.

(21) Appl. No.: 15/410,584

(22) Filed: Jan. 19, 2017

(65) Prior Publication Data

US 2018/0204266 A1 Jul. 19, 2018

(51) Int. Cl.
| | |
|---|---|
| *G06Q 30/06* | (2012.01) |
| *G06F 3/01* | (2006.01) |
| *G06F 16/9535* | (2019.01) |
| *G06F 16/2457* | (2019.01) |
| *G06F 1/16* | (2006.01) |

(52) U.S. Cl.
CPC ......... *G06Q 30/0631* (2013.01); *G06F 1/163* (2013.01); *G06F 3/011* (2013.01); *G06F 3/013* (2013.01); *G06F 3/015* (2013.01); *G06F 16/24578* (2019.01); *G06F 16/9535* (2019.01)

(58) Field of Classification Search
CPC .......... G02B 2027/0178; G02B 27/017; G06F 3/011; G06F 3/017; G06F 3/015; G06F 3/013; G06F 3/012; G06K 9/00671; G06K 9/00744; G06Q 30/0242; G06Q 30/02; G06Q 30/0203; G06T 19/006
See application file for complete search history.

(56) References Cited

U.S. PATENT DOCUMENTS

| | | |
|---|---|---|
| 8,046,797 B2 | 10/2011 | Bentolila et al. |
| 2011/0302117 A1* | 12/2011 | Pinckney ............... G06Q 30/02 706/12 |

(Continued)

OTHER PUBLICATIONS

Cernea, et al., "Detecting Insight and Emotion in Visualization Applications with a Commercial EEG Headset," SIGRAD 2011, pp. 53-60.

(Continued)

*Primary Examiner* — Sanjiv D. Patel

(57) ABSTRACT

Systems, methods, and computer readable media are provided for automatically personalizing virtual reality content ratings using biometric data on a head-mountable display (HMD) device. A server includes a transceiver configured to transmit and receive data to and from a first electronic device, a memory, and at least one processor operably connected to the memory and the transceiver. The processor(s) is configured to receive application data and biometric data, wherein the biometric data corresponds to the application data from the first electronic device, generate a rating for an application related to the application data, wherein the generated rating is based on the biometric data, and store the generated rating to a database corresponding to the application in an online store.

22 Claims, 8 Drawing Sheets

(56) References Cited

U.S. PATENT DOCUMENTS

| | | | |
|---|---|---|---|
| 2013/0293580 A1* | 11/2013 | Spivack | G06Q 30/0643 |
| | | | 345/633 |
| 2013/0339433 A1 | 12/2013 | Li et al. | |
| 2015/0356082 A1* | 12/2015 | Perdue | G06Q 30/0631 |
| | | | 707/734 |
| 2016/0259986 A1* | 9/2016 | Yun | G06K 9/00892 |
| 2017/0103322 A1* | 4/2017 | Baluja | G06Q 30/02 |
| 2017/0109437 A1* | 4/2017 | Kudo | G06F 17/30705 |
| 2017/0148083 A1* | 5/2017 | Yu | H04N 21/251 |
| 2017/0185630 A1* | 6/2017 | Tatourian | G06F 17/30241 |
| 2018/0088669 A1* | 3/2018 | Ramaprakash | G06F 1/163 |

OTHER PUBLICATIONS

Keltner, D., et al., "Facial Expression of Emotion," Handbook of Emotions 2nd Edition, Guilford Publications, Inc., 2008, pp. 236-249.

Jatupaiboon, N., et al., "Real-Time EEG-Based Happiness Detection System," The Scientific World Journal, Hindawi Publishing Corporation, vol. 2013, Article ID. 618649, http://dx.doi.org/10.1155/2013/618649, Jul. 15, 2013.

Liu, Y., et al., "Real-Time EEG-Based Emotion Recognition and its Applications," Lecture Notes in Computer Science, 2011, pp. 256-277.

Wei, C., et al., "EEG-Based Evaluation for Motion Sickness Estimation," Proceedings of the 5th International IEEE EMBS Conference on Neural Engineering, Cancun Mexico, Apr. 27-May 1, 2011, pp. 100-103.

\* cited by examiner

|  | Game 1 | Time 1 | Time 2 | Time 3 | ... | Time N | mean | std dev | |
|---|---|---|---|---|---|---|---|---|---|
| User 1 | Motion Sickness | 3 | 4 | 4 | | 3 | 3.5 | 0.5 | |
| User 1 | Frustration | 2 | 1 | 2 | ••• | 3 | 2 | 0.707 | ••• |
| User 2 | Motion Sickness | 3 | 3 | 4 | | 4 | 3.5 | 0.5 | |
| User 2 | Frustration | 1 | 1 | 2 | | 2 | 1.5 | 0.5 | |
| ⋮ | | | | | | | | | |
| User M | Motion Sickness | 3 | 4 | 4 | ••• | 3 | 3.5 | 0.5 | ••• |
| User M | Frustration | 3 | 3 | 2 | | 3 | 2.75 | 0.433 | |
| ⋮ | | | | | | | | | |
|  | Game 2 | Time 1 | Time 2 | Time 3 | | Time N | mean | std dev | |
| User 1 | Motion Sickness | 3 | 4 | 4 | ••• | 3 | 3.5 | 0.5 | ••• |
| User 1 | Frustration | 3 | 3 | 2 | | 3 | 2.75 | 0.433 | |

FIGURE 6A

|  | Game 1 Motion Sickness Mean | Game 2 Motion Sickness Mean | Game 3 Motion Sickness Mean | |
|---|---|---|---|---|
| User 1 | 3.5 | 3.5 | 3 | |
| User 2 | 3.5 | ? | 3 | ••• |
| User 3 | 2 | 3 | 1 | |
| User 4 | 5 | 5 | ? | |
| ⋮ | | | | |

FIGURE 6B

SYSTEM AND METHOD FOR VIRTUAL REALITY CONTENT RATING USING BIOMETRIC DATA

TECHNICAL FIELD

This disclosure relates generally to virtual reality systems. More specifically, an embodiment of this disclosure relates to evaluation of virtual reality content based on biometric responses.

BACKGROUND

Virtual reality content and equipment is becoming increasingly popular. Consumer purchasing decisions of virtual reality content are frequently guided by ratings or reviews that are subjective and submitted on a voluntary or sporadic basis. There is currently no system to objectively review a user's response to virtual reality content and generate consistent ratings.

SUMMARY

This disclosure provides an embodiment for a method and protocol for automatically personalizing virtual reality content rating using biometric data on a head-mountable display (HMD) device.

In a first embodiment, a server includes a transceiver configured to transmit and receive data to and from a first electronic device, a memory, and at least one processor operably connected to the memory and the transceiver. The processor(s) is configured to receive application data and biometric data, wherein the biometric data corresponds to the application data from the first electronic device, generate a rating for an application related to the application data, wherein the generated rating is based on the biometric data, and store the generated rating to a database corresponding to the application in an online store.

A second embodiment describes a method for managing an online store in a server, the server having a transceiver apparatus configured to transmit and receive data to and from a first electronic device, a memory, and at least one processor operably connected to the memory and the transceiver. The method includes receiving application data and biometric data, wherein the biometric data corresponds to the application data from the first electronic device, generating a rating for an application related to the application data, wherein the rating is based on the biometric data, and storing the generated rating to a database corresponding to the application in an online store.

In a third embodiment, a non-transitory computer readable medium embodies a computer program comprising computer readable program code that, when executed, causes at least one processor to receive application data and biometric data, wherein the biometric data corresponds to the application data from a first electronic device, generate a rating for an application related to the application data, wherein the rating is based on the biometric data, and store the generated rating to a database corresponding to the application in an online store.

Some embodiments include storing the rating for the first user in a first profile, comparing other profile ratings for the application to identify at least one similar electronic device, and generating a recommendation for a second application based on other applications with generated ratings by the at least one similar electronic device. Some embodiments include updating a recommendation collection for the application in the online store based on the rating, and generating a recommendation for the application to another user using the updated recommendation collection. In some embodiments, the recommendation is generated using collaborative filtering or content collaborative filtering. In some embodiments, the generated rating addresses at least one of a motion intensity, an emotional intensity, or difficulty of the application. In some embodiments, the biometric data can include data related to EEG activity, sweating, or eye tracking of the first user. In some embodiments, the biometric data is generated by a head mountable device in communication with a smartphone.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The term "user" includes electronic devices, such as mobile devices, HMDs, or any device used to operate an application or content.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 6A illustrates an example of ratings collected when a user is consuming the VR or AR content, such as playing a game, according to various embodiments of the present disclosure;

FIG. 6B illustrates an example of aggregated ratings for multiple users and different VR or AR content, such as multiple games, according to various embodiments of the present disclosure.

DETAILED DESCRIPTION

FIGS. 1 through 8, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Virtual reality (VR) or augmented reality (AR) systems for individual users are commonly implemented using a head mounted display (HMD). In a consumer context, the consumer can purchase VR or AR content such as applications, games, or videos, from one or more providers. Purchase criteria for VR or AR content can include response characteristics such as the motion intensity (e.g., the degree which the content may stimulate simulator or motion sickness in a user), emotional intensity (e.g., the degree which the content may upset or engage a user), and difficulty (e.g., degree that the complexity of the content may frustrate a user). Such ratings (when available) are subjective due to quick play testing or are self-reported by the developer.

Disclosed embodiments provide an HMD, with related system and method, which measures physiological response or other biometric data of a user to VR or AR content, such as electroencephalogram (EEG) activity, sweating, eye tracking, or other measurable response, to automatically rate the VR or AR content according to the biometric data.

Certain embodiments describe a method and system that use EEG, eye movement tracking or other biometric measurements on a HMD to automatically collect the data, share it with an application store or other server system, and determine the type of categorization for motion intensity, emotional intensity, or difficulty of VR or AR content best suited for the user.

Figure 1:
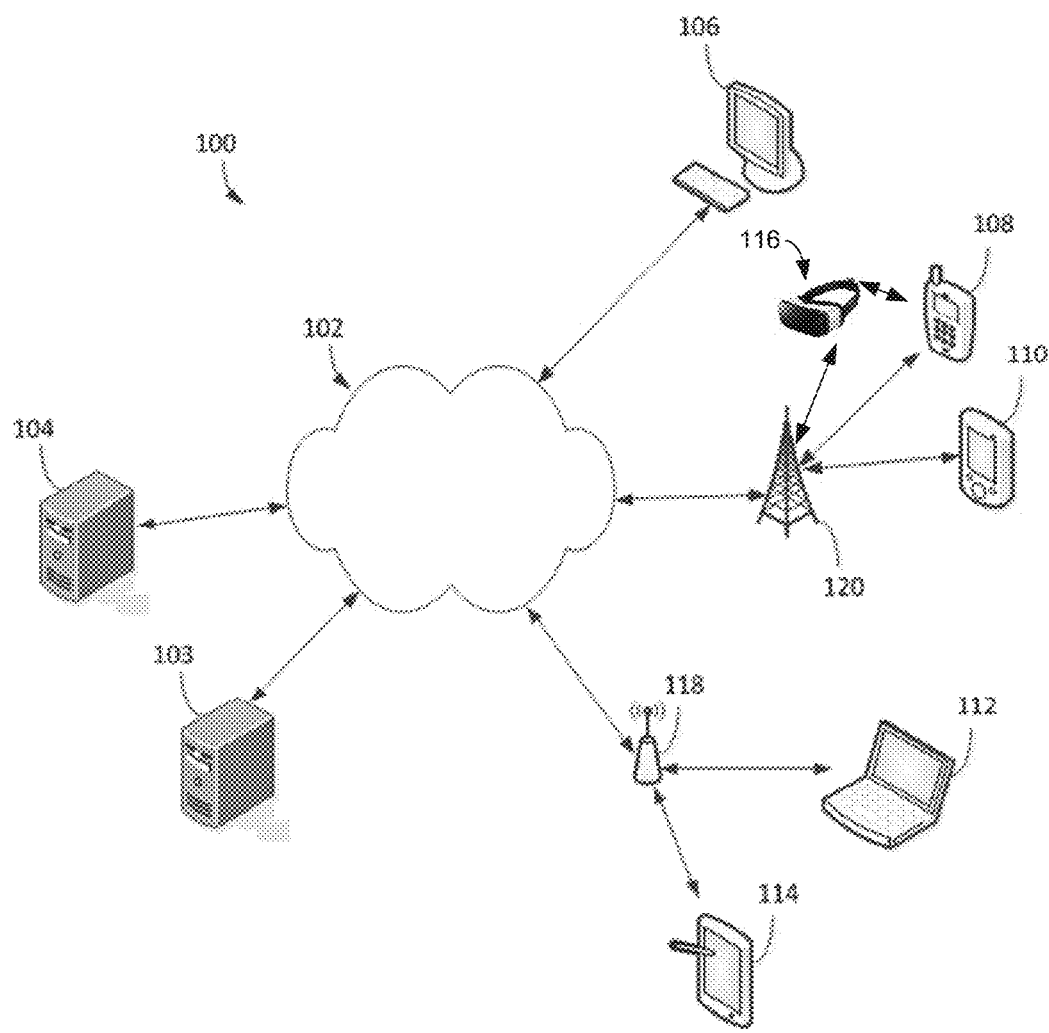
FIG. 1 illustrates an example communication system in which various embodiments of the present disclosure may be implemented.

FIG. 1 illustrates an example communication system 100 in which various embodiments of the present disclosure may be implemented. The embodiment of the communication system 100 shown in FIG. 1 is for illustration only. Other embodiments of the communication system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, or other information between network addresses. The network 102 may include one or more local area networks (LANs); metropolitan area networks (MANs); wide area networks (WANs); all or a portion of a global network, such as the Internet; or any other communication system or systems at one or more locations.

The network 102 facilitates communications between various servers 103 and 104 and various electronic devices 106-114. Each server 104 includes any suitable computing or processing device that can provide computing services for one or more electronic devices. Each server 104 could, for example, include one or more processors, one or more memories storing instructions and data, and one or more network interfaces facilitating communication over the network 102.

Each electronic device 106-114 represents any suitable computing or communication device that interacts with at least one server or other computing device(s) over the network 102. In this example, the electronic devices 106-114 include electronic devices, such as, for example, a desktop computer 106, a mobile telephones or smartphones 108, a personal digital assistant (PDA) 110, a laptop computer 112, a tablet computer 114, a headset, a wearable device, smart watch, server, etc. However, any other or additional electronic devices could be used in the communication system 100.

In this example, some electronic devices 108-114 communicate indirectly with the network 102. For example, the electronic devices 108-110 communicate via one or more base stations 120, such as cellular base stations or eNodeBs. Also, the electronic devices 112-114 communicate via one or more wireless access points (APs) 118, such as IEEE 802.11 wireless APs, Bluetooth, and WiFi direct. Note that these are for illustration only and that each electronic device could communicate directly with the network 102 or indirectly with the network 102 via any suitable intermediate device(s) or network(s).

Note that, in particular embodiments, an HMD 116 may be or may communicate with mobile telephones or smartphones 108. HMD 116 can be configured to perform any of the processes as described herein, and includes such hardware, including controllers, memory, sensors, or other devices, as necessary to perform the processes described herein.

For example, the HMD 116 may be comprised a mobile telephone or smartphone, such as mobile telephone or smartphone 108 and headset to affix the mobile telephone or smartphone 108 on a user's head. In other examples, the HMD 116 may be a standalone device or device coupled to a computer. In specific cases, HMD 116 interacts with the mobile telephone or smartphone 108, which in turn communicates with other devices. In other cases, HMD 116 can itself communicate with other devices via mobile telephones or smartphones 108. In still other cases, HMD 116 includes wireless or wired networking hardware to directly communicate with other devices via network 102. In some embodiments, HMD 116 interacts with another client device, such as any of the client devices 108-114, including desktop or portable computer systems.

As described in more detail below, the server 103 or server 104 interacts with electronic devices 108-114, for example to provide VR or AR content to these devices, to receive ratings from these devices, and to perform other processes as described herein.

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
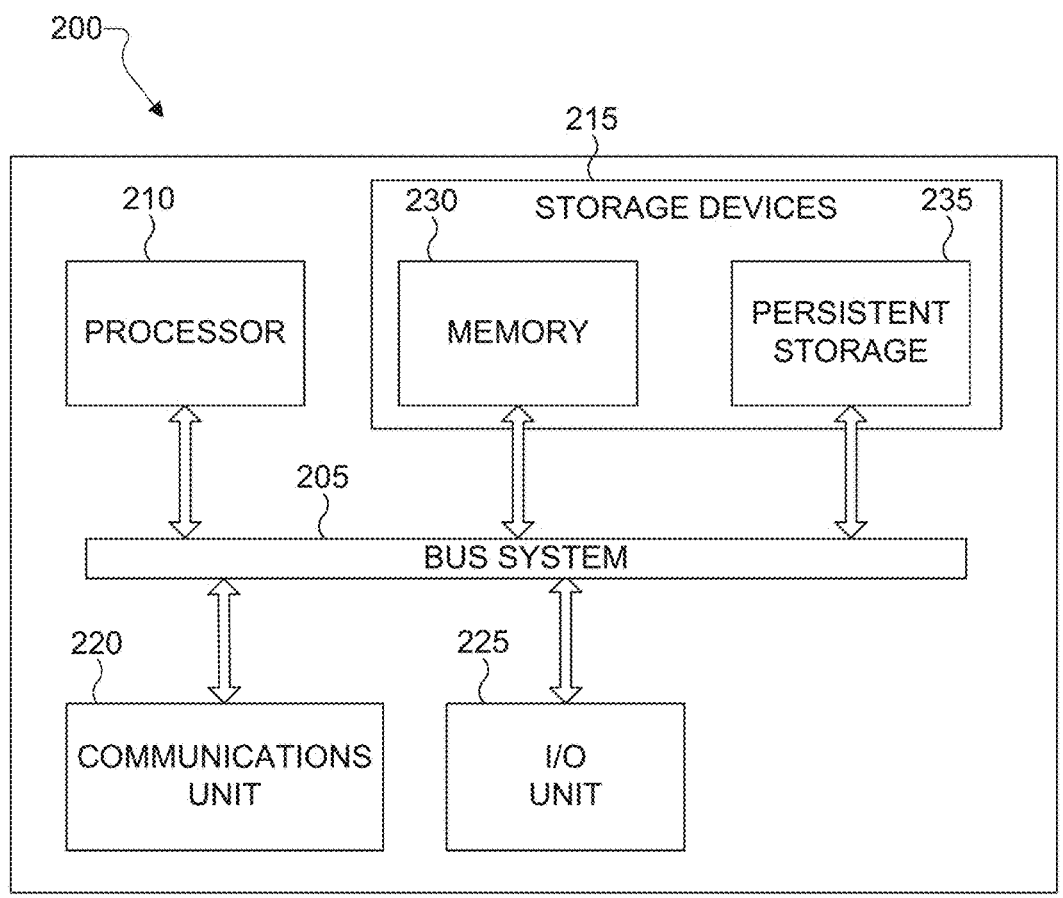
FIG. 2 illustrates an example server according to various embodiments of the present disclosure.
Figure 3:
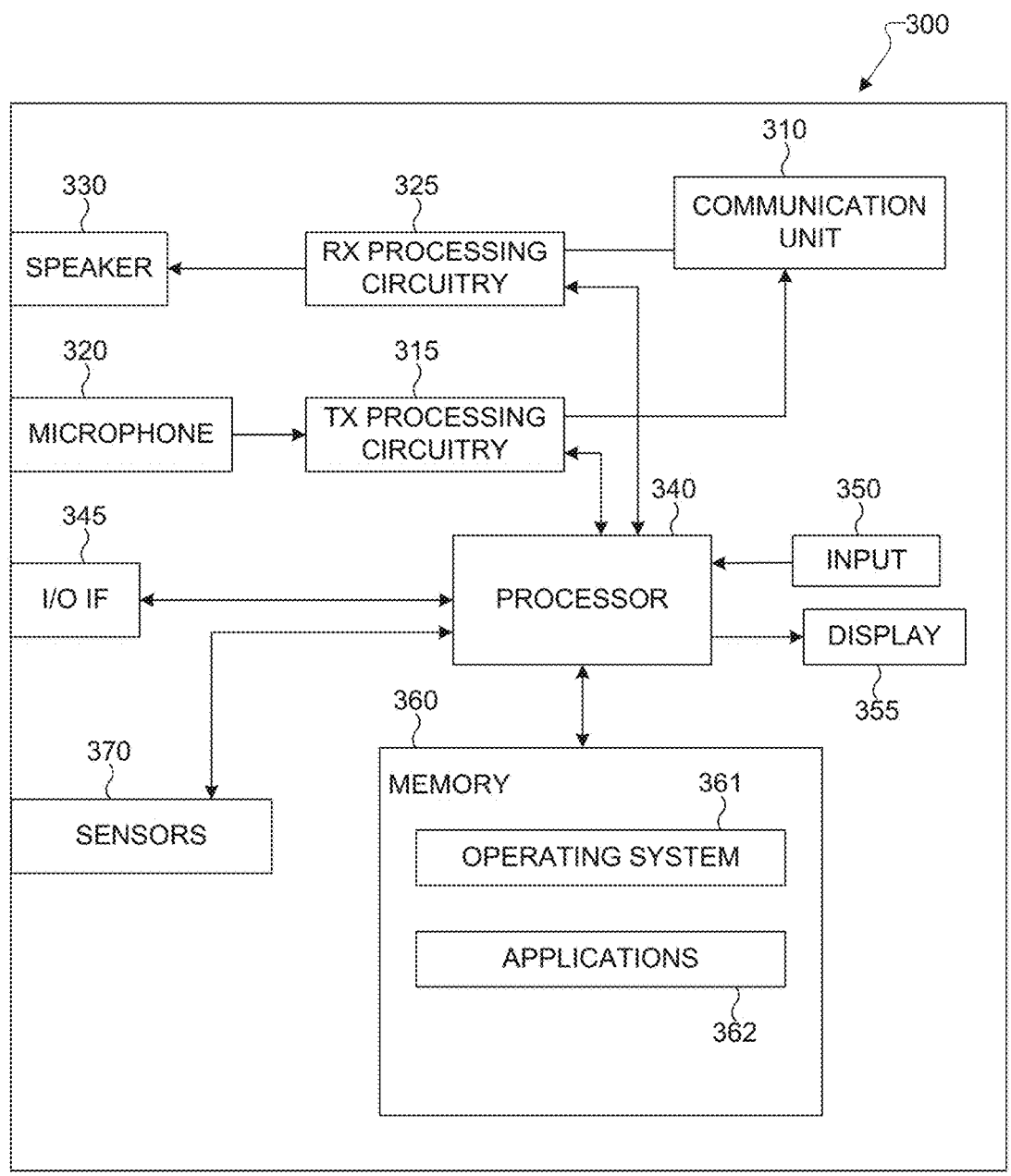
FIG. 3 illustrates an example electronic device according to various embodiments of the present disclosure.

FIGS. 2 and 3 illustrate example electronic devices in a communication system according to various embodiments of the present disclosure. In particular, FIG. 2 illustrates an example server 200, and FIG. 3 illustrates an example electronic device 300. The server 200 could represent the server 103 or the server 104 in FIG. 1, and the electronic device 300 could represent one or more of the client devices 106-116 in FIG. 1.

As shown in FIG. 2, the server 200 includes a bus system 205, which supports communication between at least one processor 210, at least one storage device 215, at least one communications unit 220, and at least one input/output (I/O) unit 225.

The processor 210 executes instructions that may be loaded into a memory 230. The processor 210 may include any suitable number(s) and type(s) of processors or other devices in any suitable arrangement. Example types of processor 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, flash memory, or optical disc.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Note that while FIG. 2 is described as representing the server 104 of FIG. 1, the same or similar structure could be used in one or more of the client devices 106-116. For example, a laptop or desktop computer could have the same or similar structure as that shown in FIG. 2.

As described in more detail below, the communications unit 220 transmits and receives data related to VR or AR content into a storage device 215, each from a different electronic device 108-116. The server 200 uses the processor 210 to perform functions are described herein for evaluating physiological data and determining ratings for VR or AR content.

As shown in FIG. 3, the electronic device 300 includes a communication unit 310. The communication unit 310 may include, for example, an RF transceiver, a BLUETOOTH transceiver, a Wi-Fi transceiver, etc. The mobile device 300 may also include transmit (TX) processing circuitry 315, a microphone 320, and receive (RX) processing circuitry 325. The electronic device 300 also includes a speaker 330, a processor 340, an input/output (I/O) interface (IF) 345, an input 350, a display 355, and a memory 360. The memory 360 includes an operating system (OS) program 361 and one or more applications 362.

The communication unit 310 may receive, from the antenna 305, an incoming RF signal transmitted by another component in a system. The communication unit 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The communication unit 310 receives the outgoing processed baseband or IF signal from the TX processing circuitry 315 and up-converts the baseband or IF signal to an RF signal that is transmitted via the antenna 305.

The processor 340 can include one or more processors or other processors and execute the OS program 361 stored in the memory 360 in order to control the overall operation of the electronic device 300. For example, the processor 340 could control the reception of forward channel signals and the transmission of reverse channel signals by the communication unit 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS program 361 or in response to signals received from external devices or an operator. The processor 340 is also coupled to the I/O interface 345, which provides the electronic device 300 with the ability to connect to other devices such as laptop computers and handheld computers.

The I/O interface 345 is the communication path between these accessories and the processor 340.

The processor 340 is also coupled to the input 350 and the display 355. The operator of the electronic device 300 can use the input 350 (e.g., keypad, touchscreen, button etc.) to enter data into the electronic device 300. The display 355 may be a liquid crystal display, a light-emitting diode (LED) display, an optical LED (OLED), an active matrix OLED (AMOLED), or other display capable of rendering text and/or at least limited graphics, such as from web sites.

The memory 360 is coupled to the processor 340. Part of the memory 360 could include a random access memory (RAM), and another part of the memory 360 could include a flash memory or other read-only memory (ROM).

As described in more detail below, the communication unit 310 continually receives a plurality of data streams into a memory 360, each from a different electronic device 300 or different electronic device 108-114. The electronic device 300 performs privacy-preserving processing of the infinite data streams in current time for a sampling size. In certain embodiments, the electronic device 300 transmits a continuous stream of data for privacy-preserving processing.

In particular embodiments, electronic device 300 can implement a VR or AR HMD as described herein. For example, electronic device 300 may be an HMD or may be insertable into a headset to form an HMD, such as for example HMD 116 in FIG. 1. In such cases in particular, but not exclusively, electronic device 300 can include sensors 370. Sensors 370 can include any physical or physiological sensors, including but not limited to EEG contacts (such as conductive plates or areas in contact with the wearer's head), motion sensors (such as multi-axis accelerometers), moisture or conductivity sensors (such as any sensor that can measure perspiration on the wearer's head), thermometers (such as ambient-air thermometers or skin-temperature thermometers), eye movement sensors (such as a camera), or other sensors.

Although FIGS. 2 and 3 illustrate examples of devices in a communication system, various changes may be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the electronic device 300 configured as a mobile telephone or smartphone, electronic devices could be configured to operate as other types of mobile or stationary devices. In addition, as with computing and communication networks, electronic devices and servers can come in a wide variety of configurations, and FIGS. 2 and 3 do not limit this disclosure to any particular electronic device or server.

Figure 4:
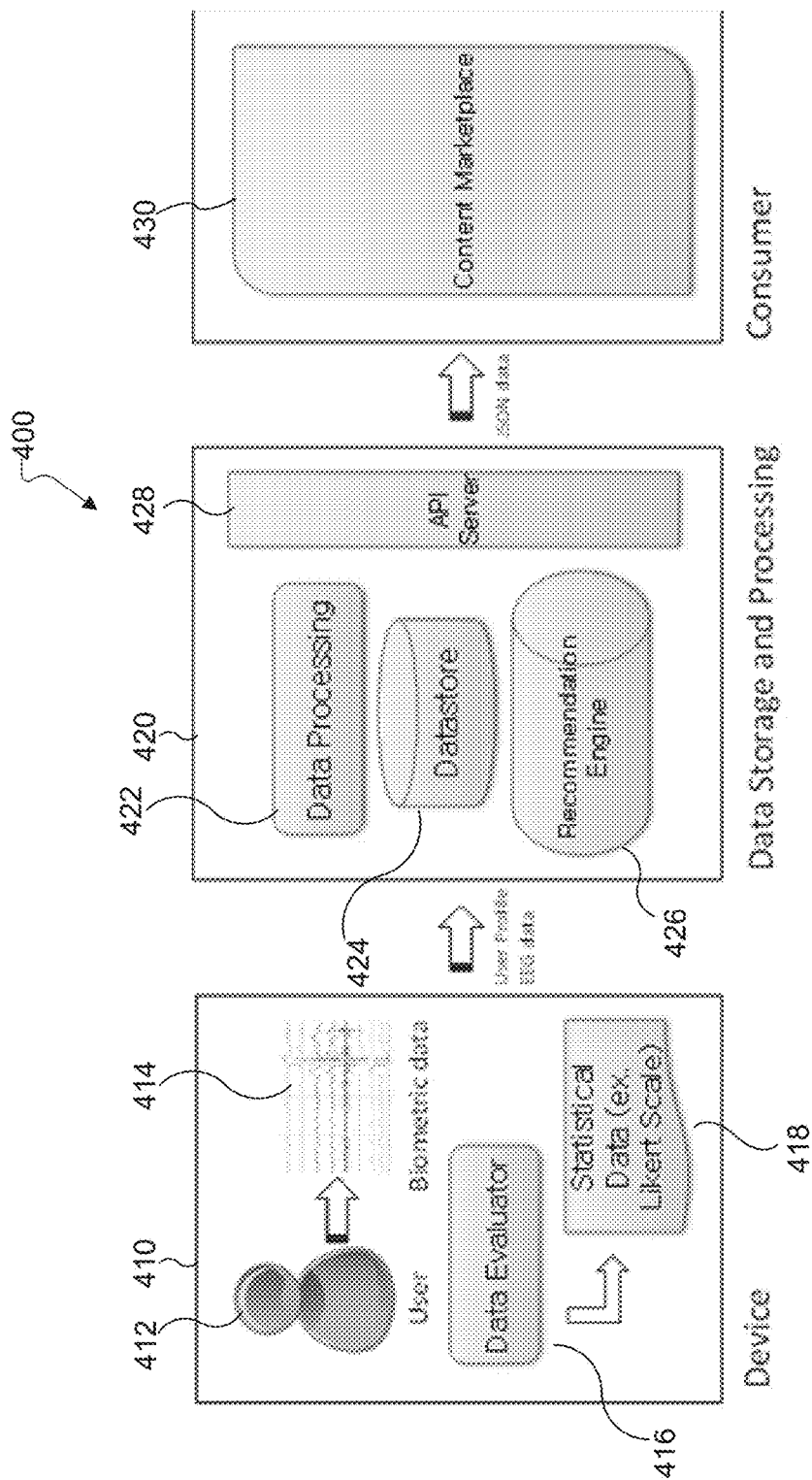
FIG. 4 illustrates an example system architecture for automatically personalizing virtual reality content rating employing biometric data collection according to various embodiments of the present disclosure.

FIG. 4 illustrates an example system architecture 400 for automatically personalizing virtual reality content rating employing biometric data collection on a HMD according to various embodiments of the present disclosure. The embodiment of the system architecture 400 illustrated in FIG. 4 is for illustration only. FIG. 4 does not limit the scope of this disclosure to any particular implementation of an electronic device.

The system architecture 400 includes a plurality of user devices 410, a data storage and processing device 420 and at a content marketplace 430.

A user device 410 can be implemented, for example, as a VR or AR HMD such as electronic device 300 or HMD 16. User device 410 collects biometric data 414 from a user 412, such as by capturing EEG data, skin-moisture (sweat) data, eye movement data, or other biometric data as described herein, as the user is using a VR or AR application. Data evaluator 416, implemented by a processor of user device 410, evaluates the biometric data 414 to produce statistical data 418, which can be stored in a memory of user device 410. In one embodiment, the statistical data 418 can represent the evaluated biometric data in terms of Likert items or a Likert scale, known to those of skill in the art, and can generally be representative of a rating of the VR or AR application. Other similar approaches for scaling responses may be utilized.

In more general terms, the user device 410 can identify an application operating while the biometric data is captured. Based on the captured biometric data, the user device 410 can generate a rating that is associated with the application; in other embodiments, the captured biometric data may be passed to another system that generates the actual rating. The user device 410 can transmit information indicating the statistical data, ratings, application data, user profile data, or other data for the application to an online store, as described in more detail below.

In the example of FIG. 4, the statistical data, ratings, application data, user profile data, or other data is transmitted to a data storage and processing system 420. Data storage and processing system 420 ("system 420") can be implemented as a server 200, server 103, or server 104. Optionally, the data storage and processing may occur on the user device 410. The received statistical data, ratings, application data, user profile data, or other data is stored in datastore 424, which can be implemented using any memory or storage device. The data is processed by data processing unit 422, which can be implemented by a processor, controller, or other similar device. Recommendation engine 426 may be a software application running on data processing unit 422, which employs or processes the statistical data, ratings, application data, user profile data, or other data to generate ratings or recommendations for the application running on device 410, which are based at least in part on biometric data 414. The ratings or recommendations may be stored in a database (or other data storage mechanism) or transmitted to a content marketplace 430, for example the data may be transmitted as JavaScript Object Notation (json) data, and can be provided via an application programming interface (API) 428. The content marketplace 430 stores the ratings or recommendations as associated with the application, and consumers are able to review the ratings or recommendations while or before purchasing the application.

Content marketplace 430 can be implemented as a separate server 200, server 103, or server 104, or as part of data storage and processing system 420.

In an embodiment, the entire process of collecting the biometric data through storing the ratings or recommendations in the content marketplace can be performed automatically and without specific user interaction, so that as the user uses the VR or AR application, his physiological response and other biometric data is recorded, processed, used to form ratings or recommendations, and used as the basis for the ratings or recommendations in the content marketplace.

Although FIG. 4 illustrates an example system architecture 400 for automatically personalizing virtual reality content rating employing biometric data collection on a HMD, various changes may be made to FIG. 4. For example, various components in FIG. 4 could be combined, further subdivided, or omitted and additional components could be added according to particular needs. As with computing and communication networks, system architecture 400 can come in a wide variety of configurations and FIG. 4 does not limit this disclosure to any particular electronic device.

Figure 5:
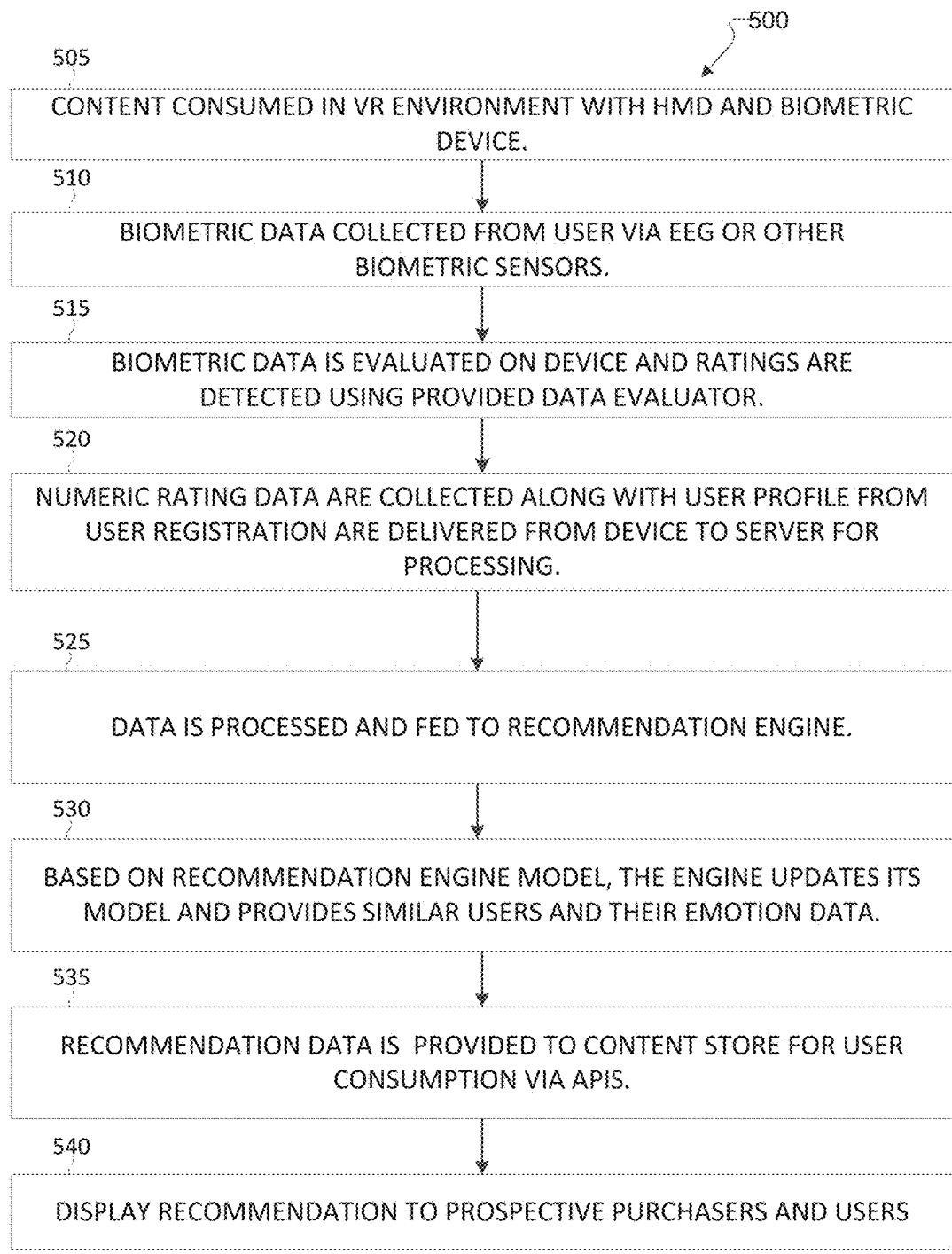
FIG. 5 illustrates an example of a process according to various embodiments of the present disclosure.

FIG. 5 illustrates an example for a process 500 according to various embodiments of the present disclosure. The embodiment of the process 500 illustrated in FIG. 5 is for illustration only. FIG. 5 does not limit the scope of this disclosure to any particular implementation of an electronic device, system, or process.

In operation 505, the user is consuming VR or AR content in a VR or AR environment with an HMD and biometric device. As described herein, in an embodiment, the biometric device is integrated in the HMD as one or more sensors configured to detect EEG data, skin-moisture (sweat) data, eye movement data, or other biometric data.

In operation 510, the biometric data, such as EEG data, skin-moisture (sweat) data, eye movement data, or other biometric data, may be collected from the user via biometric sensors.

In operation 515, the biometric data is evaluated on the device and ratings are generated using a data evaluator application and may be associated with response characteristics for the VR or AR content, such as motion sickness, frustration, motion intensity, emotional intensity, or difficulty. In various embodiments, this operation can be performed in the HMD, or can be performed by another electronic device, such as a smartphone, with which the HMD is in communication. The data evaluator process computes mental state ratings from raw data, and can produce rating in numeric form such as Likert items or Likert scale. Different data evaluator processes, for different types of data, can have different outputs, and so any data harvesting processes can accommodate different output formats. The ratings can be normalized using techniques such as normal distribution, quantile, z-score, min-max normalization variations, and mean normalization.

In operation 520, numeric rating data may be accessed from the biometric data evaluation, along with a user profile from user registration, and are delivered from the device to a server system for processing. That is, the device collects the ratings and transmits the ratings to the data store on the server system. The data store collects all relevant information about the user and user's biometric-based ratings.

In operation 525, the data may be processed by the server system and sent to a recommendation engine. Such a recommendation engine can be implemented as an application on the server system, and can, as a non-limiting example, be implemented by a product such as the Apache™ Mahout software product. The recommendation engine uses machine learning techniques such as collaborative filtering and content collaborative filtering to process the data. To find similar users, the engine can use techniques such as Pearson similarity, cosine similarity, city block similarity, Euclidean distance, log likelihood, and Tanimoto coefficient, among others. The recommendation engine may offload data to a data store.

In cases where no previous biometric data from the identified user is available, the following steps can be employed. A hybrid approach with collaborative filtering and a content-based approach can be used to solve cold start and sparsity problems.

In operation 530, based on the recommendation engine processing, the engine may update a collection for the VR or AR content and provides similar users and their emotion data.

In operation 535, the recommendation data may be provided to other entities for eventual user consumption (e.g., an online content store). The recommendation data can be provided via APIs or any other method.

In operation 540, the recommendation may be displayed to prospective purchasers and users (e.g., within an online content store). For example, the online content store can display "Motion sickness level based on user similar to you." Such a recommendation can be based on the collected biometric data from the captured biometric data.

FIGS. 6A and 6B illustrate examples of portions of data tables. FIG. 6A illustrates an example of ratings collected when a user is consuming the VR or AR content, such as playing a game. In this example, the data is stored in a ratings table 600. In typical usage, these ratings are collected each time the user consumes the VR or AR content. Optionally, the ratings may be collected intermittently or during random sessions.

This example shows that the system can collect ratings for multiple users (e.g., user 602) and for multiple games (e.g., game 604). The system can rate the response characteristics 606 at multiple times 608, based on the biometric data, as shown by rating 610. Overall ratings, for a game, particular response characteristics, or otherwise, can be aggregated from individual ratings, such as in mean rating 612 or standard deviation of ratings 614.

FIG. 6B illustrates an example of aggregated ratings for multiple users and different VR or AR content, such as multiple games. In this example, the data is stored in a second ratings table 650. This ratings table shows multiple users 602 for VR or AR content games 604, and motion sickness mean ratings 612 for each user/content combination.

The aggregated ratings can be used to generate a data collection such as that used in the Apache™ Mahout software product, for example as data in a comma-separated-value (csv) format: userId, gameId, motion sickness mean rating.

The exemplary tables in FIGS. 6A and 6B are merely exemplary. Such tables may be expanded to include data for additional users, content (games, applications, etc.), times, aggregate ratings, metrics, etc. The tables could include more rows or columns of the respective data. For example, the data table in FIG. 6B could include more than four users and more games. In another example, each data table could include more sub-groups (such as games in FIG. 6A).

The following describes a non-limiting example of one implementation of a process as disclosed herein. Of course, other approaches can be used.

In this example, the system can create a data collection by importing a csv file as described above. As described, the .csv file may include aggregated ratings derived from VR or AR application data and biometric data of the users. The system can then find similar users, for example using a Pearson Product-Moment Correlation, which measures the correlation between users. Such a correlation may result in a 0 for no correlation, a +1 with positive correlation and a −1 for negative correlation. The data collection can also be referred to as a recommendations collection when used to recommend applications to users in an online store.

Table 1 shows an example of correlation between users for a given response characteristic rating:

TABLE 1

| Correlation | User 1 | User 2 | User 3 |
|---|---|---|---|
| User 1 | 1 | 0.8 | 0.2 |
| User 2 | 0.8 | 1 | 0.3 |
| User 3 | 0.2 | 0.3 | 1 |

The system can set a threshold for finding similar users and create a recommender. For example, the system can set:

UserNeighborhood neighborhood=new ThresholdUserNeighborhood(0.1, similarity, model);

UserBasedRecommender recommender=new GenericUserBasedRecommender(model, neighborhood, similarity);

where UserNeighborhood is used for similar users, ThresholdUseNeighborhood is for creating a threshold for similar used, similarity is a value for the amount of similarity between a user and a neighbor, and UserBased Recommender is used for creating a recommender.

The system can then determine user recommendations. For example, the system can determine:

List recommendations=recommender.recommend(2, 5); // User 2's top 5 game recommendations;

float estimatedRating=recommender.estimatePreference (2, 2); // User 2's Game 2 estimated rating for display in content store.

where List recommendations lists User 2's top 5 app recommendations, and float estimatedRating is used User 2's estimated rating of Game 2 for display in the content store.

The following is an example of a data format that can be used to send biometric data from the HMD or other device along with other information to a processing server. The exemplary data format provides ratings for emotions (e.g., fear, joy, etc) along with physical indications (e.g., discomfort, nausea, fatigue, etc.):

```
{
    "user":{
        "name":"User 1",
        "age":20,
        "gender":"male",
        "ratings":{
            "fear":5,
            "joy":0,
            "generalDiscomfort":2,
            "nausea":2,
            "fatigue":1
        }
    },
    "content":{
        "appName":"MyApp",
        "version":"v1",
        "effects":{
            "disorientation":2
        },
        "specification":{
            "age":"PG-13",
            "fps":"24",
            "db":10
        }
    },
    "device":{
        "display":{
            "screenSize":"2560x1440",
            "cpu":"quad-core",
            "os":"android"
        }
    }
}
``` where the "user" represents a specific profile, "name" is the user's name, "age" is the user's age, "gender" is the user's gender, the ratings are values specific to each emotion of physical indication such as "fear," "joy," "generalDiscomfort," "nausea," and "fatigue."

The following is an example of a data format that can be used to send recommendation data from the to an online content store:

```
{
    "user":{
        "name":"User 1",
        "recentlyRatedApps":[
            "My App"
        ]
    },
    "userAppData":{
        "name":"App 1",
        "recommendation":{
            "fear":4,
            "sadness":0,
            "generalDiscomfort":1
        }
    },
    "content":{
        "name":"App 1",
        "version":"v1"
    }
}
``` where the "user name" represents the name of the user, the "recentlyRatedApps" represents the apps that have been rated most recently, the "recommendation" represents different emotional categories and the values that correspond to the emotional categories of a user using an app, such as "fear" represents the amount of fear in the user detected by the system, "sadness" represents the amount of sadness in the user detected by the system, and "generalDiscomfort" represents the state of general discomfort of the user while the app is operating.

Figure 7:
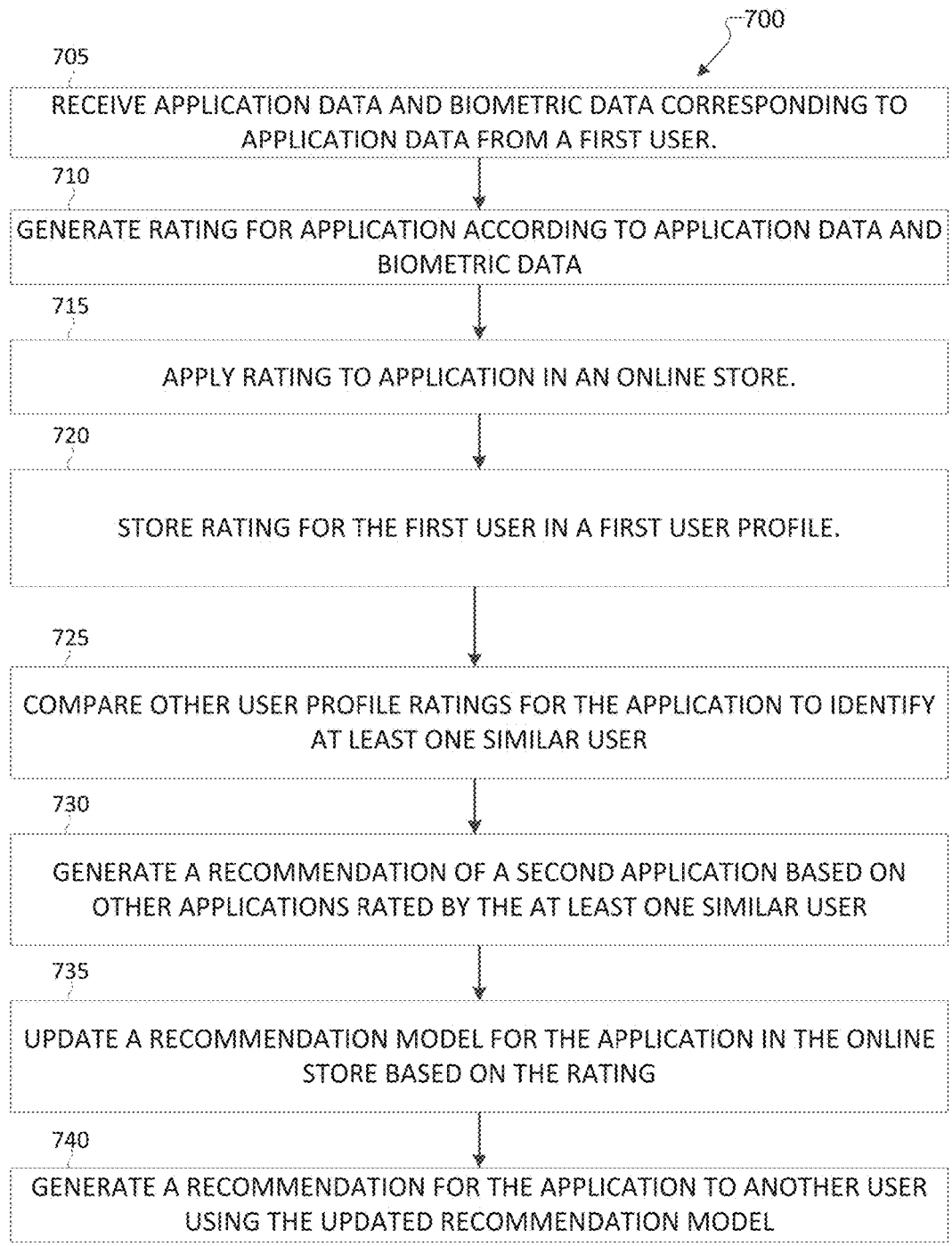
FIGS. 7 and 8 illustrate examples of processes according to various embodiments of the present disclosure.

FIG. 7 illustrates an example for a process 700 according to various embodiments of the present disclosure, for example for ratings determination and recommendation in an online store on a server. The embodiment of the process 700 illustrated in FIG. 7 is for illustration only. FIG. 7 does not limit the scope of this disclosure to any particular implementation of an electronic device, system, or process, and can be implemented, for example, by one or more of the systems or devices illustrated in FIGS. 1-4. In specific embodiments, the process of FIG. 7 is performed by a server having a wireless or wired transceiver apparatus configured to transmit and receive data to and from a first user, a memory, and at least one processor operably connected to the memory and the transceiver. The processor(s) is configured to perform the operations described below. Other embodiments include a non-transitory computer readable medium embodying a computer program that has computer readable program code that, when executed, causes at least one processor to perform operations as in FIG. 7. The term "user" includes electronic devices, such as mobile devices, HMDs, or any device used to operate an application or content.

In operation 705, the server receives application data and biometric data corresponding to the application data from the first user. The "application data" describes VR or AR content as discussed herein, such as an identification of a specific VR or AR application, game, or other content, generally referred to as the "application." The biometric data corresponds to the application data, and is collected as the user consumes the application. The biometric data can include data related to EEG activity, sweating, eye tracking, or other physiological or biometric responses of the first user to the application as described herein.

In operation 710, the server generates a rating for an application according to the application data and the biometric data. The rating can be for a motion intensity, an emotional intensity, or difficulty of the application, or other physiological or biometric responses to the application as described herein.

In operation 715, the server applies the rating to the application in an online store.

In operation 720, the server stores the rating for the first user in a first user profile.

In operation 725, the server compares other user profile ratings for the application to identify at least one similar user.

In operation 730, the server generates a recommendation of a second application based on other applications rated by the at least one similar user. The recommendation can be generated using machine learning techniques such as collaborative filtering or content collaborative filtering.

In operation 735, the server updates a recommendation collection for the application in the online store based on the rating.

In operation 740, the server generates a recommendation for the application to another user using the updated recommendation collection.

The recommendation, ratings, and other data discussed herein can also be transmitted to a user device, displayed to a user, or otherwise communicated to a user via the online store or otherwise.

Figure 8:
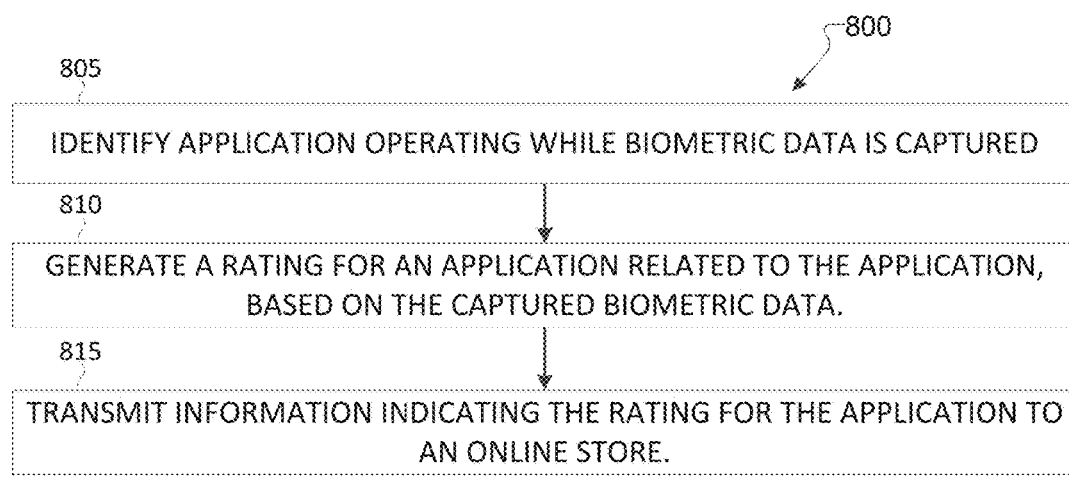

FIG. 8 illustrates an example for a process 800 according to various embodiments of the present disclosure, for example for operating an HMD in support of determining rating and recommendations in an online store on a server. The embodiment of the process 800 illustrated in FIG. 8 is for illustration only. FIG. 8 does not limit the scope of this disclosure to any particular implementation of an electronic device, system, or process, and can be implemented, for example, by one or more of the systems or devices illustrated in FIGS. 1-4. In specific embodiments, the process of FIG. 8 is performed by an HMD having a wireless or wired transceiver apparatus configured to transmit and receive a signal, a plurality of sensors configured to capture biometric data, a memory, and at least one processor operably connected to the memory, the transceiver, and the plurality of sensors. The processor(s) is configured to perform the operations described below. Other embodiments include a non-transitory computer readable medium embodying a computer program that has computer readable program code that, when executed, causes at least one processor to perform operations as in FIG. 8. The term "user" includes electronic devices, such as mobile devices, HMDs, or any device used to operate an application or content.

In operation 805, the HMD identifies an application operating while the biometric data is captured.

In operation 810, the HMD generates a rating for an application related to the application, based on the captured biometric data. The rating can be for a motion intensity, an emotional intensity, or difficulty of the application, or other physiological or biometric response to the application as described herein.

In operation 815, the HMD transmits information indicating the rating for the application to an online store.

Various techniques can be used for detecting response characteristics and detecting emotion or other information. For example, some techniques known to those of skill in the art are described in the following documents, all of which are hereby incorporated by reference:

"EEG-based Evaluation System for Motion Sickness Estimation," Chun-Shu Wei et al., Proceedings of the 5th International IEEE EMBS Conference on Neural Engineering, 2011;

"Facial Expression of Emotion," Dacher Keltner and Paul Ekman, In M. Lewis and J Haviland-Jones (eds), *Handbook of emotions,* 2nd edition, 2000;

"Detecting Insight and Emotion in Visualization Applications with a Commercial EEG Headset," Daniel Cernia et al., SIGRAD 2011;

"Real-time EEG-based Emotion Recognition and its Applications," Yisi Liu et al., Transactions on Computational Science XII, 2011; and "Real-Time EEG-Based Happiness Detection System," Noppadon Jatupaiboon, et al., The Scientific World Journal Volume 2013.

Exemplary techniques include:

As an example, a process of emotion classification consists of several steps. First of all a stimulus such as picture, audio, and movie is needed. The participant is exposed to the stimuli and EEG signal is recorded accordingly. Then artifacts that contaminate EEG signal are removed. These EEG data are analyzed and relevant features are extracted. Some parts of data of which are test data, are classified using this model.

As another example, a two-dimensional Arousal-Valence model is described. This model allows the mapping of the discrete emotion labels in the Arousal-Valence coordinate system as shown in FIG. 4. The advantage of using this model is that arousal and valence levels of emotions can be defined with the calculated FD values. For example, the increase in arousal level corresponds to the increase of FD values. Then, by using ranges of arousal and valence level, discrete emotions are obtained from the model. Finally, any emotion that can be represented in the Arousal-Valence model can be recognized by the emotion recognition algorithm. The raw EEG data gathered from different sensors are the input to a 2 to 42 Hz band-pass filter. Then, Higuchi fractal dimension algorithm with a sliding window of window size 1024 and 99% overlapping is applied to the filtered data. The benefit of the usage of the sliding window is that it enables real-time processing. The FD value calculated from FC6 is used to distinguish the arousal level independently by comparing with a default threshold. The change of FD could be mapped along the arousal axis since it is revealed that higher arousal level was associated with larger FD values. Based on this observation, continuous recognition of changing emotion from low arousal to high arousal is enabled. For example, satisfied, pleasant, and happy are all positive emotions but with different arousal levels—ranging from low arousal to high arousal level, and their corresponding FD values also ranges from small one to large one.

The difference of FD values between left hemisphere and right hemisphere (AF3-F4) is computed simultaneously. After the arousal level has been identified, the valence level of emotions is recognized within the similar arousal level by comparing the difference of FD with another threshold that is set for valence level recognition.

Finally based on the arousal level and valence level, the emotions are mapped into a 2D model. In the algorithm, default thresholds are set for real-time emotion recognition based on the experiments' results. However, because of the existence of individual difference which means the pattern of emotion for one particular subject is consistent but FD values may vary among different subjects, a training session is needed to be introduced in order to improve the accuracy. The procedure for the training session is similar to the real-time scheme, except the input is EEG data of the labeled emotions of the particular subject. Then, thresholds are calculated and the lateralization pattern is found based on the data collected from the training session for each subject. The pattern of newly collected EEG data is recognized according to the comparisons with the calculated thresholds obtained from the training session.

The processes described and illustrated herein are examples, and various changes could be made to these processes within the scope of the disclosure. For example, when shown as a sequential series of operations, various operations could overlap, occur in parallel, occur in a different order, occur multiple times, or not be performed in certain embodiments. The figures and examples used herein are used to illustrate various embodiments of the present disclosure, and are for illustration only. These particular examples do not limit the scope of this disclosure to any particular implementation, device, or process, except as claimed herein. Elements, features, or operations described in specific examples can be combined, in whole or in part, in other embodiments within the scope of this disclosure.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An electronic device comprising:
   a transceiver configured to transmit and receive data to and from a first electronic device;
   a memory; and
   at least one processor connected to the memory and the transceiver, the at least one processor configured to:
      receive application data and biometric data, wherein the biometric data corresponds to an application identified by the application data and the application is currently being operated on the first electronic device while the biometric data is captured;
      generate a rating of biometric categories based on the biometric data for the application related to the application data;
      store the rating in a database corresponding to the application in an online store;
      store the rating in a first profile corresponding to the first electronic device;
      identify at least one similar profile by comparing the rating with other ratings for the application from a plurality of other profiles; and
      generate a recommendation for a second application based on a similar rating to the rating of the application from ratings of other applications from the at least one similar profile.

2. The electronic device of claim 1, wherein the biometric categories include a motion intensity, an emotional intensity, and a difficulty.

3. The electronic device of claim 1, wherein the recommendation is generated using collaborative filtering or content collaborative filtering.

4. The electronic device of claim 1, wherein the at least one processor is further configured to:
   update a recommendation collection for the application in the online store based on the rating; and
   generate a recommendation for the application to another electronic device using the updated recommendation collection.

5. The electronic device of claim 1, wherein the rating represents at least one of: a motion intensity, an emotional intensity, or difficulty of the application.

6. The electronic device of claim 1, wherein the biometric data includes data related to at least one of EEG activity, sweating, or eye tracking of the first electronic device.

7. The electronic device of claim 1, wherein the biometric data is generated by a head mountable display (HMD) device in communication with a smartphone.

8. A method for managing an online store in a server, the method comprising:
   receiving application data and biometric data, wherein the biometric data corresponds to an application identified by the application data and the application is currently being operated on a first electronic device while the biometric data is captured;
   generating a rating based on the biometric data for the application related to the application data;
   storing the rating in a database corresponding to the application or content in an online store;
   storing the rating in a first profile corresponding to the first electronic device;
   identifying at least one similar profile by comparing the rating with other ratings for the application from a plurality of other profiles; and
   generating a recommendation for a second application based on a similar rating to the rating of the application from ratings of other applications from the at least one similar profile.

9. The method of claim 8, wherein the recommendation is generated using collaborative filtering or content collaborative filtering.

10. The method of claim 8, further comprising:
    updating a recommendation collection for the application in the online store based on the rating; and
    generating a recommendation for the application to another electronic device using the updated recommendation collection.

11. The method of claim 8, wherein the rating represents at least one of: a motion intensity, an emotional intensity, or difficulty of the application.

12. The method of claim 8, wherein the biometric data includes data related to at least one of: EEG activity, sweating, or eye tracking of the first electronic device.

13. The method of claim 8, wherein the biometric data is generated by a head mountable display (HMD) device in communication with a smartphone.

14. A non-transitory computer readable medium embodying a computer program, the computer program comprising computer readable program code that when executed causes at least one processor to:
    receive application data and biometric data, wherein the biometric data corresponds to an application identified by the application data and the application is currently being operated on a first electronic device while the biometric data is captured;
    generate a rating of biometric categories based on the biometric data for the application related to the application data;
    store the rating in a database corresponding to the application in an online store;
    store the rating in a first profile corresponding to the first electronic device;
    identify at least one similar profile by comparing the rating with other ratings for the application from a plurality of other profiles; and
    generate a recommendation for a second application based on a similar rating to the rating of the application from ratings of other applications from the at least one similar profile.

15. The non-transitory computer readable medium of claim 14, wherein the recommendation is generated using collaborative filtering or content collaborative filtering.

16. The non-transitory computer readable medium of claim 14, further comprising computer readable program code that when executed causes the at least one processor to:
update a recommendation collection for the application in the online store based on the rating; and
generate a recommendation for the application to another electronic device using the updated recommendation collection.

17. The non-transitory computer readable medium of claim 14, wherein the rating represents at least one of: a motion intensity, an emotional intensity, or difficulty of the application.

18. The non-transitory computer readable medium of claim 14, wherein the biometric data includes data related to at least one of: EEG activity, sweating, or eye tracking of the first electronic device.

19. The non-transitory computer readable medium of claim 14, wherein the biometric data is generated by a head mountable display (HMD) device in communication with a smartphone.

20. A head mountable display (HMD) device comprising:
a transceiver to transmit and receive one or more signals;
a plurality of sensors configured to capture biometric data;
a memory; and
at least one processor connected to the memory, the transceiver, and the plurality of sensors, the at least one processor configured to:
identify an application or content operating while the biometric data is captured, wherein the biometric data corresponds to the application or content currently operating on the HMD;
based on the captured biometric data, generate a rating of biometric categories for the application or content operating on the HMD;
transmit information regarding the rating to an online store; and
receive a recommendation for a second application based on a similar rating to the rating of the application from ratings of other applications from at least one similar profile, where the at least one similar profile is identified by comparing the rating with other ratings for the application from a plurality of other profiles.

21. The HMD device of claim 20, wherein the rating addresses at least one of: a motion intensity, an emotional intensity, or difficulty of the application.

22. The HMD device of claim 20, wherein the biometric data includes data related to at least one of: EEG activity, sweating, or eye tracking of the HMD.

* * * * *